(12) United States Patent
Dyer et al.

(10) Patent No.: US 12,137,122 B1
(45) Date of Patent: Nov. 5, 2024

(54) APPARATUS AND METHOD FOR DETERMINING AND RECOMMENDING TRANSACTION PROTOCOLS

(71) Applicant: Seashell Financial Holdings, LLC, Vero Beach, FL (US)

(72) Inventors: John Dyer, Vero Beach, FL (US); Mark Archambault, Naples, FL (US)

(73) Assignee: Seashell Financial Holdings, LLC, Vero Beach, FL (US)

( * ) Notice: Subject to any disclaimer, the term of this patent is extended or adjusted under 35 U.S.C. 154(b) by 0 days.

(21) Appl. No.: 18/134,217

(22) Filed: Apr. 13, 2023

(51) Int. Cl.
| | |
|---|---|
| *G06Q 40/08* | (2012.01) |
| *H04L 9/40* | (2022.01) |
| *H04L 41/0894* | (2022.01) |

(52) U.S. Cl.
CPC ............ *H04L 63/20* (2013.01); *G06Q 40/08* (2013.01); *H04L 41/0894* (2022.05); *G06Q 2220/00* (2013.01)

(58) Field of Classification Search
CPC ................................................... G06Q 40/08
USPC ........................................................... 705/4
See application file for complete search history.

(56) References Cited

U.S. PATENT DOCUMENTS

| | | | |
|---|---|---|---|
| 8,433,588 B2 | 4/2013 | Willis | |
| 11,514,529 B2 | 11/2022 | Chmielewski | |
| 2009/0210258 A1 | 8/2009 | Cardot | |
| 2012/0016692 A1 | 1/2012 | Jenkins-Robbins | |
| 2019/0057454 A1* | 2/2019 | Komenda | G06Q 40/08 |
| 2021/0158451 A1* | 5/2021 | Blazek | G06Q 40/08 |

\* cited by examiner

*Primary Examiner* — Cho Kwong
(74) *Attorney, Agent, or Firm* — Caldwell Intellectual Property Law

(57) ABSTRACT

An apparatus for determining and recommending transaction protocols, the apparatus includes at least a processor and a memory communicatively connected to the at least a processor, wherein the memory contains instructions configuring the at least a processor to receive entity data from an entity, determine at least a protocol metric for each protocol object of a plurality of protocol objects as a function of the entity data, wherein each protocol object of the plurality of protocol objects includes a policy sub-element, select at least two protocol objects from the plurality of protocol objects as a function of the at least a protocol metric of each protocol object, modify the policy sub-element of the at least two protocol objects as a function of the entity data, and generate a policy agreement as a function of the at least two protocol objects.

16 Claims, 7 Drawing Sheets

APPARATUS AND METHOD FOR DETERMINING AND RECOMMENDING TRANSACTION PROTOCOLS

FIELD OF THE INVENTION

The present invention generally relates to the field of artificial intelligence. In particular, the present invention is directed to an apparatus and method for determining and recommending transaction protocols.

BACKGROUND

Generation of viable transaction protocols using automated processes suffers from a lack of precision. This is due at least in part to the complexity and uncertainty regarding the data to be analyzed.

SUMMARY OF THE DISCLOSURE

In an aspect, an apparatus for determining and recommending transaction protocols is described. The apparatus includes at least a processor and a memory communicatively connected to the at least a processor, wherein the memory contains instructions configuring the at least a processor to receive entity data from an entity, determine at least a protocol metric for each protocol object of a plurality of protocol objects as a function of the entity data, wherein each protocol object of the plurality of protocol objects includes a policy sub-element, select at least two protocol objects from the plurality of protocol objects as a function of the at least a protocol metric of each protocol object, modify the policy sub-element of the at least two protocol objects as a function of the entity data, and generate a policy agreement as a function of the at least two protocol objects.

In another aspect, a method for determining and recommending transaction protocols is described. The method includes receiving entity data from an entity, determining at least a protocol metric for each protocol object of a plurality of protocol objects as a function of the entity data, wherein each protocol object of the plurality of protocol objects includes a policy sub-element, selecting at least two protocol objects from the plurality of protocol objects as a function of the at least a protocol metric of each protocol object, modifying the policy sub-element of the at least two protocol objects as a function of the entity data, and generating a policy agreement as a function of the at least two protocol objects.

These and other aspects and feature of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
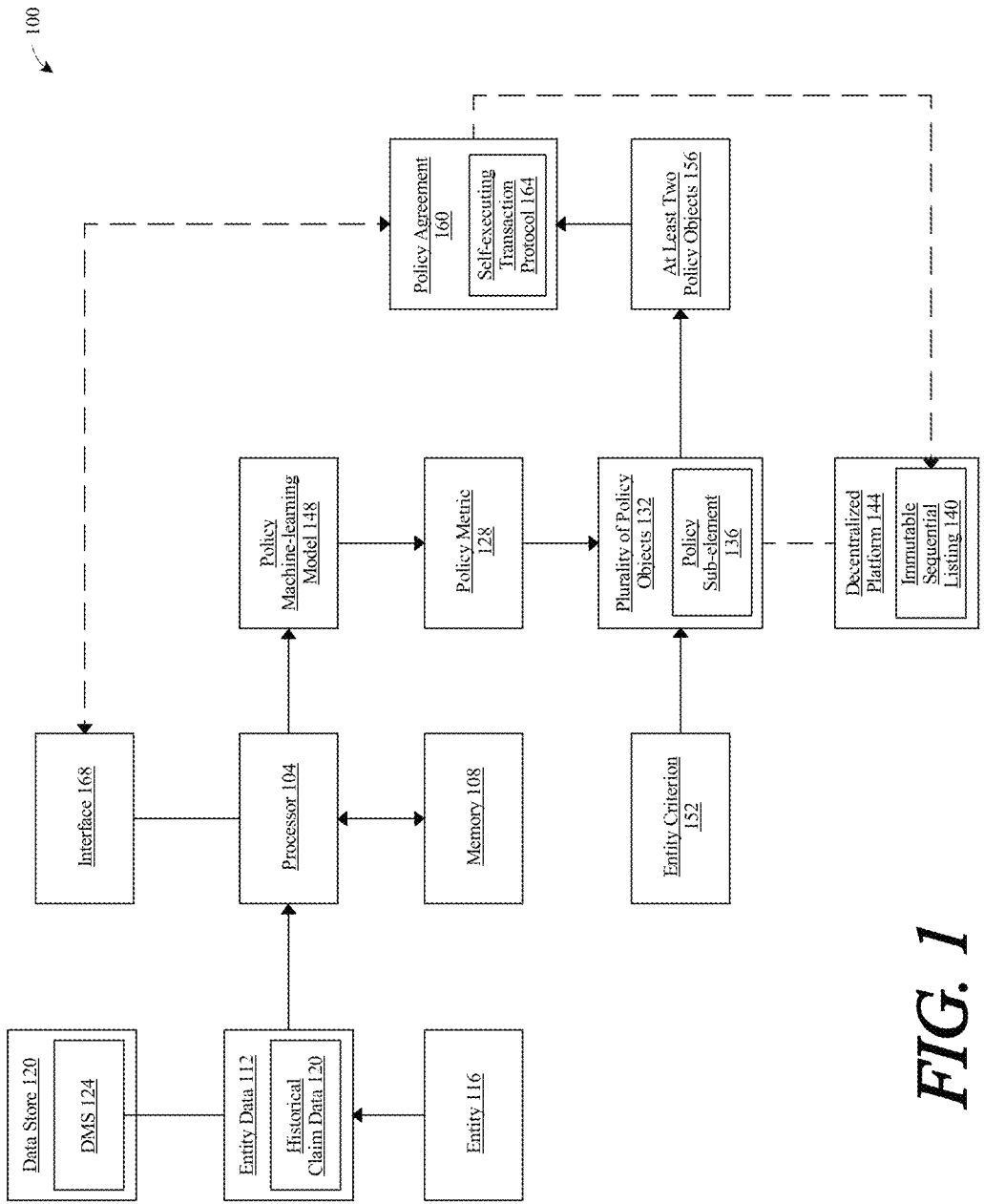
FIG. 1 is a block diagram of an exemplary embodiments of an apparatus for determining and recommending transaction protocols.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining and recommending transaction protocols. In an embodiment, apparatus may be configured to receive entity data from an entity or a data store. Data store may include a dealer management system (DMS). In some cases, entity data may include historical claim data.

Aspects of the present disclosure can be used to select protocol objects from a plurality of protocol objects as a function of entity data. Aspects of the present disclosure can also be used to generate a policy agreement based on selected protocol objects. This is so, at least in part, because apparatus is configured to determine at least a protocol metric for each protocol objects of plurality of policy as a function of entity data.

Aspects of the present disclosure allow for customizing generated policy agreement. Exemplary embodiments illustrating aspects of the present disclosure are described below in the context of several specific examples.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus for determining and recommending transaction protocols is illustrated. Apparatus 100 includes a processor 104 and a memory 108 communicatively connected to the processor 108. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, methods, systems, and apparatuses described in this disclosure may operate on transaction protocols. A "transaction protocol," as used in this disclosure, is a data structure with elements instantiating rules and/or protocols describing interactions between entities. For instance, and without limitation, a transaction protocol may represent a contract or policy, such as an insurance contract and/or policy. A transaction protocol may include a self-executing transaction protocol as described in further detail below.

With continued reference to FIG. 1, processor 104 is configured to receive entity data 112 from an entity 116. As used in this disclosure, "entity data" refers to information related to entity 116. As used in this disclosure, an "entity" is an independent and distinct existence such as a legal person. In some cases, legal person may include, without limitation, individual, group of individuals, trust, foundation, partnership, limited partnership, corporation, other business entity or firm, or the like thereof. In other cases, legal person may further include government such as, without limitation, municipality, state government, provincial government, departmental government, national or federal government, quasi-governmental organization, and/or the like thereof. In some embodiments, entity 116 may include one or more sub-entities such as, without limitation, departments or divisions of entities described above. In a non-limiting example, entity 116 may include a policy holder at an insurance company, a dealership, and the like. Entity data 112 may include information related to entity 116. Exemplary embodiments of entity data 112 are described in further detail below.

With continued reference to FIG. 1, in some cases, entity data 112 may include personal information of entity 116. As used in this disclosure, "personal information" refers to specific detail that can be used to identify entity 116. In a non-limiting example, personal information of entity 116 may include, without limitation, name, address, contact, date of birth, social security number (SSN), and the like. In some cases, entity data 112 may include financial information of entity 116. As used in this disclosure, "financial information" refers to specific details related to entity's financial position or performance. In a non-limiting example, financial information of entity 116 may include, without limitation, personal annual income, credit score, financial history of entity 116 and the like. In another non-limiting example, financial information of entity 116 may include occupation information of entity 116 such as information related to, without limitation, current employer, previous employers, and the like. In some cases, entity data 112 may include payment information of entity 116. As used in this disclosure, "payment information" refers to specific details required to process a financial transaction (i.e., transfer of funds from a first entity to a second entity for the purchase of goods or services). In a non-limiting example, payment information of entity 116 may include, without limitation, payment amount, card number, account information, transaction histories, and the like. In some cases, entity data 112 may include health information of entity 116. As used in this disclosure, "health information" refers to specific details related to the physical or mental health of entity 116. In a non-limiting example, health information of entity 116 may include health history of entity 116 such as, without limitation, pre-existing conditions, current medications, previous medical procedures, and the like.

With continued reference to FIG. 1, in some cases, entity data 112 may include historical claim data 120. As used in this disclosure, "historical claim data" are information related to one or more claims that have been filed by entity 116 such as, without limitation, policy holder in the past, wherein the claims are requests of one entity to another entity for compensation or coverage for a loss or damage that is covered under the terms of an insurance policy represented by transaction protocol. In a non-limiting example, historical claim data may include one or more protocol objects purchased by entity 116 in the past. Protocol objects will be described in further detail below in this disclosure. In some cases, historical claim data may include historical claim data of other entities. For instance, and without limitation, historical claim data may include insurance market data, wherein the insurance market data are information and/or statistics about the market about insurance industry and the market for insurance products and services. In a non-limiting example, insurance market data may include, without limitation, data on insurance premiums, claims, policies, market trends, and the like.

With continued reference to FIG. 1, in some cases, entity data 112 may include vehicle or property information of entity 116. As used in this disclosure, "vehicle or property information" refers to specific details about a vehicle or property associated with entity 116 that may be used to access risk and determine insurance coverage and premiums. In a non-limiting example, in case of auto insurance, entity data 112 may include, without limitation, make, model, year of manufacture, and the like of the vehicle associated with entity 116. In another non-limiting example, in case of property insurance, entity data 112 may include, without limitation, area, location, layout, features, asset value, and the like of the property associated with entity 116. Additionally, or alternatively, vehicle or property information may further include information related to the use of vehicle or property of entity 116. In a non-limiting example, entity data 112 may include information related to the driving habits of entity 116. Driving habit may include, without limitation, driving above the posted speed limit, applying the brakes suddenly and/or forcefully, rapidly accelerating, distracted driving, driving during high-risk time, and the like.

With continued reference to FIG. 1, in some embodiments, receiving entity data 112 from entity 116 may include receiving one or more documentations containing entity data 112 from entity 116. In a non-limiting example, processor 104 may be configured to accept applications (i.e., data forms) containing entity data 112 from entity 116 electronically or in paper. In some cases, processor 104 may utilize optical character recognition (OCR) to process entity data 112 from documentations submitted or uploaded by entity 116 into machine-readable text. Optical character recognition may include automatic conversion of images of written, such as without limitation typed, handwritten or printed text, into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases, OCR may be an "offline" process, which analyses a static document or image frame. In some cases, handwriting movement analysis can be used as input to a handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform, such as, without limitation, homography or affine transform, to image component to align text. In some cases, a de-speckle process may include removing positive and negative spots and/or smoothing edges. In some cases, a binarization process may include converting an image from color or greyscale to black-and-white, such as without limitation a binary image. Binarization may be performed as a simple way of separating text or any other desired image component from a background of image component. In some cases, binarization may be required for example if an employed OCR algorithm only works on binary images. In some cases. A line removal process may include removal of non-glyph or non-character imagery, such as without limitation boxes and lines. In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 2-5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks, for example neural networks as described in reference to FIGS. 4-5.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, receiving entity data 112 may include receiving entity data from a data store 120. Data store 120 may be implemented, without limitation, as a relational database, a key-value retrieval database such as a NOSQL database, or any other format or structure for use as a database that a person skilled in the art would recognize as suitable upon review of the entirety of this disclosure. Data store 120 may alternatively or additionally be implemented using a distributed data storage protocol and/or data structure, such as a distributed hash table or the like. Data store 120 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, data store 120 may include a dealer management system (DMS) 124. As used in this disclosure, a "dealer management system (DMS)" is a bundled management information system for automotive dealerships and similar businesses that is configured to help them manage their operations more efficiently and effectively. In some cases, DMS 124 may include an inventory management component, wherein the inventory management component may be configured to track/monitor vehicle inventory, including new and used cars, parts, accessories, and the like. In some cases, DMS 124 may include a sales management component, wherein the sales management component may be configured to handle complete sales processes; for instance, and without limitation, from lead generation to final sale, including creation of quotes, invoices, and other documentations. In some cases, DMS 124 may include a customer relationship management (CRM) component, wherein the CRM component may be configured to manage entity data 112 and tracking interactions with entity 116. In some cases, DMS 124 may include a service management component, wherein the service management component may be configured to manage scheduling of service appointments, tracking work orders, and handling the ordering. DMS 124 may be integrated with other components or systems such as, without limitation, accounting and payroll systems, manufacturing systems, and/or the like. In a non-limiting example, entity data 112 may be stored in DMS 124. In some cases, entity data 112 may be pulled by processor 104 DMS 124 when entity 116 is a returning customer. Exemplary embodiments of DMS may include, without limitation, CDK Global, Dealertrack, Reynolds and Reynolds, and the like.

With continued reference to FIG. 1, in some embodiments, processor 104 may generate a chatbot configured to continuously monitor and receive entity data 112 from entity 116. A "chatbot" as used in this disclosure is a program that communicates semantic information between an individual and a computing device. A chatbot may be communicative with processor 104. Processor 104 may be configured to operate a chatbot. In some cases, a chatbot may be local to processor 104. Alternatively, or additionally, in some cases, a chatbot may be remote to processor 104 and communicative with processor 104, by way of one or more networks, such as without limitation the internet. Alternatively, or additionally, a chatbot may communicate with processor 104 using telephonic devices and networks, such as without limitation fax machines, short message service (SMS), or multimedia message service (MMS). In some embodiments, a chatbot may communicate with processor 104 using text-based communication, for example without limitation using a character encoding protocol, such as American Standard for Information Interchange (ASCII). Processor 104 may interface with a chatbot, by way of at least a submission from entity 116, such as through the chatbot, and a response from the chatbot. In many cases, one or both of submissions and responses may be text-based communication. Alternatively, or additionally, in some cases, one or both of submissions and responses may be audio-based communication.

Continuing in reference to FIG. 1, a submission once received by processor 104 operating a chatbot, may be processed by processor 104. In some embodiments, processor 104 may process a submission using one or more keyword recognition, pattern matching, and natural language processing, machine learning models, and the like. In some embodiments, processor 104 may employ real-time learning with evolutionary algorithms. In some cases, processor 104 may retrieve a pre-prepared response from a storage component, based upon a submission. Alternatively, or additionally, in some embodiments, processor 104 may communicate a response without first receiving a submission, which may initiate a conversation. In some cases, processor 104 may communicate an inquiry to a chatbot. Processor 104 may be configured to process an answer to the inquiry in a following submission from a chatbot. In some cases, an answer to an inquiry present within a submission from an entity through a chatbot may be used by processor 104 as an input to another function, for example without limitation, entity data 112, and the like thereof.

With continued reference to FIG. 1, processor 104 may process entity data 112 including without limitation, textual input/submission from entity 116, using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in some embodiments, processor 104 may utilize an automatic speech recognition model to process entity data 112, such as without limitation, voice input from entity 116. In such embodiment, entity data 112 may be submitted via a phone application by entity 116. An automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known apriori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively, or additionally, in some cases, processor 104 may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include a subject. For example, a subject may speak within solicitation video, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum aposteriori probability estimates of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used as an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. Neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, processor 104 is configured to determine at least a protocol metric 128 for each protocol object of a plurality of protocol objects 132 as a function of the entity data 112. "Protocol object," for the purpose of this disclosure, refers to a specific policy configuration. In an embodiment, protocol object may include a type of insurance coverage or policy that is offered by a first entity (i.e., insurance company) to a second entity (i.e., policy holder). In a non-limiting example, each protocol object of plurality of protocol objects 132 may be differentiate with each other through at least one of policy sub-elements as described below. In an embodiment, protocol object may include a property damage protocol object, wherein the property damage protocol object is a protocol object that covers damages to the vehicle of entity 116 resulting from a covered event such as a collision. In an embodiment, protocol object may include a liability protocol object, wherein the liability protocol object is a protocol object that protects entity 116 against claims arising from bodily injury or property damage caused to third parties. In another embodiment, protocol object may include a comprehensive protocol object, wherein the comprehensive protocol object is a protocol object that provides protection against damages to the vehicle of entity 116 resulting from non-collision events like theft, vandalism, or natural disasters. In another embodiment, protocol object may include a business interruption protocol object, wherein the business interruption protocol object is a protocol object that provides financial protection against losses incurred due to a temporary shutdown of business operations following a covered event. In a further embodiment, protocol object may include a personal injury protection (PIP) protocol object, wherein PIP protocol object is a protocol object that covers medical expenses and lost wages for entity 116 and passengers in the event of an accident, regardless of fault.

Still referring to FIG. 1, each protocol object of plurality of protocol objects 132 may include a policy sub-element 136. As used in this disclosure, a "policy sub-element" refers to an individual component or aspect within protocol object that contributes to the overall structure, coverage, and terms of the insurance policy. In some cases, policy sub-element 136 may define the scope and cost of the insurance protection provided. In some embodiments, protocol object may include a plurality of policy sub-elements; for instance, and without limitation, policy sub-element 136 may be a building lock of protocol object, wherein the policy sub-element 136 may be modified or combined to create tailored insurance policy as described in further detail below. In an embodiment, policy sub-element 136 may include a coverage type, wherein the coverage type is a specific risk or events that one or more protocol objects cover. In a non-limiting example, policy sub-element 136 may include liability, collision, comprehensive, medical payment, uninsured/underinsured motorist protection, and the like. In another embodiment, policy sub-element 136 may include a policy limit, wherein the policy limit is the maximum amount insurance company will pay for a covered loss. In a non-limiting example, policy sub-element 136 including policy limit may be set per occurrence, on an aggregate basis, specific to certain coverage types as described above, or the like. In another embodiment, policy sub-element 136 may include a deductible, wherein the deductible is the amount entity 116 need to pay out-of-pocket before protocol object executed (i.e., take effect). In another embodiment, policy sub-element 136 may include a premium, wherein the premium is the cost of the protocol object. In such embodiment, policy sub-element 136 may be influenced by other policy sub-elements as described in this disclosure. In a further embodiment, policy sub-element 136 may include a single term or condition of plurality of terms and conditions (i.e., specific rules, exclusions, requirements and the like that define the scope of the insurance policy). In such embodiment, policy sub-element 136 may include, without limitation, at least a portion of coverage territory, endorsement or rider that modify standard policy provisions, and the like. Additionally, or alternatively, each protocol object of plurality of protocol objects 132 may include at least an insurance product. As used in this disclosure, an "insurance product" is a service offered by corresponding protocol object. In a non-limiting example, protocol object may include an insurance product such as, without limitation, key replacement, prepaid maintenance, oil change, tire rotation and balancing, brake service, battery service, wheel alignment, air filter replacement, and the like. Policy sub-element 136 may include a configuration of a single insurance product as described above; for instance, and without limitation, policy sub-element may include a specific type of battery that may be changed during a battery service.

With continued reference to FIG. 1, in some cases, plurality of protocol objects 132 may be stored in the DMS 124 as described above. For instance, and without limitation, DMS 124 may include a finance and insurance (F&I) component configured to streamlining the finance and insurance process by integrating with entity such as, without limitation, lenders, insurance provides, and other financial institutions to manage quotes, protocol objects, contracts, and the like. In other cases, plurality of protocol objects 132 may be contained in an immutable sequential listing 140 in a decentralized platform. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 140 may be, include and/or implement an immutable ledger, where data entries that have been posted to the immutable sequential listing cannot be altered. Immutable sequential listing 140 will be described in further detail below with reference to FIG. 2.

With continued reference to FIG. 1, apparatus 100 may include a decentralized platform 144 for which the processor 104 and/or apparatus 100 may operate on. A "decentralized platform," as used in this disclosure, is a platform or server that enables secure data exchange between anonymous entities. Decentralized platforms may be supported by any blockchain technologies. For example, and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform can make it difficult if not impossible to discern a particular center. In some embodiments, decentralized platform can include a decentralized ecosystem. Decentralized platform may serve as an ecosystem for decentralized architectures such as an immutable sequential listing 140 and/or blockchain.

In a non-limiting embodiment, and still referring to FIG. 1, decentralized platform may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform may enable communication between a plurality of computing devices, wherein it is built on a back-end of peer-to-peer, decentralized network of nodes, the applications run on decentralized storage systems rather than centralized servers. In some embodiments, these nodes may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing 142. Any digitally signed assertions onto immutable sequential listing 142 may be configured to be confirmed by the World Computer. Alternatively or additionally, apparatus 100 may be configured to store a copy of immutable sequential listing 142 into memory 108. This is so, at least in part, to process a digitally signed assertion that has a better chance of being confirmed by the World Computer prior to actual confirmation. In a non-limiting embodiment, decentralized platform may be configured to tolerate localized shutdowns or attacks; it is censorship-resistant. In another non-limiting embodiment decentralized platform and/or apparatus 100 may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of decentralized platform 144 for purposes as described herein.

With continued reference to FIG. 1, as used in this disclosure, a "protocol metric" is a quantifiable measurement used to evaluate one or more protocol objects based on the entity data 112. At least a protocol metric 128 may indicate the suitability of corresponding protocol object for entity 116. In some cases, at least a protocol metric may include a numeric measurement. In an embodiment, policy sub-element 316 may be used directly as at least a protocol metric 128; for instance, and without limitation, premium, policy limit, deductibles and the like. In some cases, at least a protocol metric may include a scale measurement. In an embodiment, at least a protocol metric 128 may include a customer satisfaction ratings, wherein the customer satisfaction rating may indicate an overall satisfaction with an insurance provider, in the non-limiting example wherein transaction protocol represents an insurance policy and/or agreement. In a non-limiting example, determining at least a protocol metric 128 for each protocol object of plurality of protocol objects 132 may include assigning a rating score to each protocol object of plurality of protocol objects 132, wherein the rating score may be calculated by averaging scores provided by plurality of policy holders. In another embodiment, at least a protocol metric may include a claim settlement ratio, wherein the claim settlement ratio is the percentage of claims settled by the insurance provider compared to the total number of claims received from plurality of policy holders. In a non-limiting example, determining at least a protocol metric 128 for each protocol object of plurality of protocol objects 132 may include calculating claim settlement ratio as a function of historical claim data for each protocol object of plurality of protocol objects 132. Other exemplary embodiments of protocol metric may include, without limitation, loss ratio, solvency ratio, policy cancelation rate, average claim processing time, net promoter score (NPS), and the like. Additionally, or alternatively, determining at least a protocol metric 128 for each protocol object of plurality of protocol objects 132 may include determining an overall protocol metric as a function of plurality of protocol metric as listed above. By evaluating at least a protocol metric 128, entity 116 and insurance providers may make better-informed decisions about plurality of protocol objects 132, thereby ensuring the best possible coverage and value for the needs and preferences of entity 116.

Continuing to reference FIG. 1, processor 104 may use a machine learning module, to implement one or more algorithms or generate one or more machine-learning models, such as policy machine learning model 148, to determine at least a protocol metric 128 for each protocol object of plurality of protocol objects 132. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from data store 120, such as DMS 124, or be provided by entity 116. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine leaning module may be used to generate policy machine learning model 148 using training data. Policy machine learning model 148 may be trained by correlated inputs and outputs of training data. Training data may be data sets that have already been converted from raw data whether manually, by machine, or any other method. Training data may include previous outputs such that policy machine learning model 148 iteratively produces outputs. Policy machine learning model 148 using a machine-learning process may output converted data based on input of training data.

With continued reference to FIG. 1, in an embodiment, determining at least a protocol metric 128 for each protocol object of plurality of protocol objects 132 may include determining at least a protocol metric 128 for each protocol object of plurality of protocol objects 132 using a machine leaning model, such as policy machine learning model 148. Policy machine learning model 148 may be trained by training data, such as policy training data. In an embodiment, policy training data may include a plurality of entity data 112 that are each correlated to at least a protocol metric 128 for each protocol object of plurality of protocol objects 132. In another embodiment, each element of entity data 112 may correlated to a plurality of protocol metrics for each protocol object of plurality of protocol objects 132. For example, and without limitation, policy training data may be used to show entity data 112 may indicate a particular protocol metric for a given protocol object. Entity data 112 may include any entity data described in this disclosure, such as, without limitation, personal information, payment information, financial information, health information, historical claim data 120, vehicle or property information, and the like. Determining at least a protocol metric 128 for each protocol object of plurality of protocol objects 132 using a machine learning model may further include training policy machine learning model 148 as a function of policy training data and determining at least a protocol metric 128 for each protocol object of plurality of protocol objects 132 using trained policy machine learning model 148.

With continued reference to FIG. 1, processor 104 is configured to select at least two protocol objects 156 from plurality of protocol objects 132 as a function of at least a protocol metric 128 of each protocol object. In some cases, at least two protocol objects 156 may be manually selected by entity 116. In a non-limiting example, entity 116 may define a protocol metric threshold, wherein the protocol metric threshold is a predetermined value or level in which protocol metric 128 must exceed or cannot exceed. Protocol metric threshold may be determined by entity 116. Processor 104 may be configured to compare protocol metric 128 of each protocol object to protocol metric threshold. In a non-limiting example, at least two protocol objects 156 that reach protocol metric threshold may be selected. In other cases, at least two protocol objects 156 may be automatically selected by processor 104. In some embodiments, selecting at least two protocol objects 156 from plurality of protocol objects 132 may include generating an entity criterion 152 as a function of entity data 112. As used in this disclosure, an "entity criterion" is a specific measure or set of measures derived from entity data 112 that are used to evaluate and compare protocol objects and policy sub-elements thereof. In some cases, entity criterion 152 may include one or more relevant factors, wherein the relevant factors are elements of data that are most relevant to the insurance needs of entity 116. Relevant factors may be identified as a function of entity data 112. In a non-limiting example, relevant factors may include financial status of entity 116 for a protocol object with high-standard policy sub-element such as high premium or deductible as described above. In a non-limiting example, entity criterion 152 may include measures such as, without limitation, coverage comprehensiveness, affordability, claim settlement efficiency, overall satisfaction, and the like. Generating entity criterion 152 may include generating entity criterion as a function of one or more relevant factors. In some embodiments, generating entity criterion 152 may include normalize and/or weight entity criterion 152. In a non-limiting example, processor 104 may be configured to normalize each measure within entity criterion 152 to ensure comparability across plurality of protocol objects 132 and assign a weight to each measure within entity criterion 152 based on relevant factors identified from entity data 112. Entity 116 may prioritize affordability over coverage comprehensiveness, thereby resulting in a higher weight being assigned to affordability measures. Processor 104 may then combine normalized and/or weighted measures to create a composite entity criterion 152.

With continued reference to FIG. 1, selecting at least two protocol objects 156 from plurality of protocol objects 132 may further include ranking plurality of protocol objects 132 as a function of entity criterion 152 via a ranking algorithm. As used in this disclosure, a "ranking algorithm" is a computational process used to evaluate, compare, or otherwise prioritize a set of items, such as plurality of protocol objects 132, based on specific criteria, such as protocol metric 128 and/or entity criterion 152. In an embodiment, ranking plurality of protocol objects 132 may include comparing each protocol metric 128 associated with each protocol object of plurality of protocol objects 132. In a non-limiting example, processor 104 with ranking algorithm implemented may be configured to rank plurality of protocol objects 132 based on protocol metric 128 in a descending order. Protocol object with higher protocol metric may be prioritized more than protocol object with lower protocol metric. In another embodiment, ranking algorithm may be configured to take entity criterion 152 into consideration. In a non-limiting example, entity criterion 152 may include affordability of protocol object for entity 116. Ranking algorithm may be configured to compare each protocol object of plurality of protocol objects 132 based on the policy sub-element 136 such as, without limitation, policy premiums, and the financial information within entity data 112 of entity 116, such as total income or budget. Protocol object with lower premiums and a better fit for the entity's budget would receive a higher rank, while those with higher premiums or that exceed the budget would receive a lower rank. In another non-limiting example, entity criterion 152 may include coverage comprehensiveness of protocol object for entity 116. Ranking algorithm may be configured to evaluate protocol objects based on policy sub-element 136 such as, without limitation, terms and conditions (i.e., the scope and extent of coverage offered), and assign higher ranks to protocol objects that provide more comprehensive protection for the risks and needs specific to entity 116. Selecting at least two protocol objects 156 may include selecting at least two protocol objects with high ranks. In a non-limiting example, processor 104 may be configured to sort plurality of protocol objects 132 according to their rank in a descending order subsequent to ranking plurality of protocol objects and select one or more protocol objects from plurality of protocol objects 132 in that order. Exemplary embodiments of ranking algorithms may include, without limitation, deterministic ranking algorithms, probabilistic ranking algorithms, Bayesian ranking algorithm, log-linear model ranking algorithm, and the like.

With continued reference to FIG. 1, in some cases, plurality of policy objects 132 may be re-insurable. Plurality of policy objects 132 may be offered by a first entity (e.g., an insurance company) to a second entity (i.e., policyholder), wherein plurality of policy objects 132 may be also associated with a third entity (e.g., a financial institution and/or a dealership). In a non-limiting example, third entity may actively participate in plurality of policy objects 132 by sharing financial risk associated with plurality of policy objects 132. In some cases, first entity may be a ceding company that transfers at least a portion of the insurance risk to third entity, wherein the third entity may be referred to as the reinsurer. In a non-limiting example, one or more policy objects 132 may be shared between more than one entity. Entities associated with these policy objects 132 may be responsible for handling a share of each policy object (i.e., one or more policy sub-elements within each policy object, or claims arising from the policy objects 132 specified in these policy objects 132). In another non-limiting example, selecting at least two policy objects 156 may include selecting at least two policy objects 156 from plurality of third-party policy objects, wherein each third-party policy objects may be associated with the third entity, and wherein the plurality of third-party policy objects is absent from plurality of policy objects 132.

With continued reference to FIG. 1, processor 104 is configured to modify policy sub-element 136 of at least two protocol objects 156 as a function of entity data 112. In some embodiments, modifying policy sub-element 136 may include adjusting policy sub-element 136 to align with the needs and/or preferences of entity 116; for instance, and without limitation, adjusting policy sub-element 136 may include matching policy sub-element 136 to entity criterion 152. In a non-limiting example, modifying policy sub-element 136 may include identifying one or more policy sub-elements 136 for modification of at least two protocol objects. In some cases, policy sub-elements 136 may include any policy sub-elements as described in this disclosure such as, without limitation, coverage types, policy limits, deductibles, premiums, terms and conditions, insurance products, and the like. Processor 104 may adjust, for example, and without limitation, increasing or decreasing coverage limits, adjusting deductibles, changing premium rates, adding endorsement, switch insurance products, and the like to corresponding protocol object of at least two protocol objects 156. Such modification may expand or restrict coverage of one or more protocol objects. Additionally, or alternatively, modifying policy sub-element 136 of at least two protocol objects 156 may include validating at least two protocol objects 156 to ensure adjusted policy sub-elements 136 not only meet the need and preference of entity 116 but also comply with regulatory requirements and underwriting guidelines. In a non-limiting example, modification to policy sub-elements 136 may adhere to applicable laws and regulations governing at least two protocol objects 156 in the jurisdiction of entity 116; for instance, and without limitation, this may include minimum coverage requirements, mandated policy provisions, reporting guidelines, and the like. Processor 104 may also verify that modified policy sub-elements may align with the policy holder's underwriting guidelines and risk tolerance; for instance, and without limitation, processor 104 may verify modified policy sub-elements as a function of entity data 112 such as risk profile, loss history, any other data that may impact the willingness of entity 116 to provide coverage.

With continued reference to FIG. 1, processor 104 is configured to generate a policy agreement 160 as a function of at least two protocol objects 156. As used in this disclosure, a "policy agreement" is a legal contract between a first entity, such as insurance provider, and a second entity, such as entity 116 (i.e., policy holder), outlining policy sub-elements 136 (e.g., terms and conditions) of at least two protocol objects 156. In a non-limiting example, policy agreement 160 may specify the risks covered, the extent of coverage, premium amount, policy term, rights and responsibilities of both insurance provider and entity 116, and the like. In some embodiments, generating the policy agreement may include combining at least two protocol objects 156. Combining at least two protocol objects 156 may include iterating each protocol object of at least two protocol objects 156 and concatenating policy sub-elements 136 of each protocol object of at least two protocol objects 156; for instance, and without limitation, processor 104 may be configured to merge policy sub-elements 136 with similar coverage types. In another non-limiting instance, combining at least two protocol objects 156 may include harmonizing sub-elements 136 with conflicting terms and conditions. In a further non-limiting instance, combining at least two protocol objects 156 may include finalizing policy sub-elements 136; for instance, generating policy agreement 160 may include calculating a final premium for the combined protocol objects by adding premium of each protocol object of at least two protocol objects 156 together. Additionally, or alternatively, generating policy agreement 160 may include checking, by processor 104, modified policy sub-elements 136 are consistent with policy agreement 160 and do not create ambiguities or contradictions within policy agreement 160.

With continued reference to FIG. 1, processor 104, in some embodiments, policy agreement 160 may include a self-executing transaction protocol 164. As used in this disclosure, a "self-executing transaction protocol" is an algorithm, data structure, and/or record which automatically executes and controls legally relevant events and actions according to policy agreement 160. Objectives of self-executing transaction protocol 164 may include reduction of need in trusted intermediators, arbitrations and enforcement costs, fraud losses, as well as the reduction of malicious and accidental exceptions. Self-executing transaction protocol 164, in one embodiment, may permit trusted transactions and agreements to be carried out among disparate, anonymous parties without the need for a central authority, legal system, or external enforcement mechanism. Self-executing transaction protocol 164 may contain and/or include in postings representations of one or more agreed upon actions and/or transactions to be performed. A self-executing transaction protocol 164 may contain and/or include payments to be performed, including "locked" payments that are automatically released to an address of a party upon performance of terms of contract. Self-executing transaction protocol 164 may contain and/or include in postings representations of items to be transferred, including without limitation, protocol objects or payments in crypto currencies. Persons skilled in the art, upon reviewing the entirety of this disclosure, will be aware of the various embodiments and implementation of a self-executing transaction protocol for purposes as described herein.

In a non-limiting example, and still referring to FIG. 1, policy agreement 160 including self-executing transaction protocol 164 may be posted, by processor 104, to immutable sequential listing 140 as described in this disclosure. Processor 104 may be configured to generate and dispose a block associate with policy agreement 160 on immutable sequential listing 140, wherein the block may be configured to store policy agreement 160; for instance, and without limitation, policy agreement 160 may include a smart contract presented in decentralized platform 144. Policy agreement 160 stored in the block may be retrieved, by processor 104 and/or any other computing device, from immutable sequential listing 140; however, processor 104 and/or any other computing device may not change, modify, or otherwise update policy agreement 160 in any way such as, without limitation, modifying policy sub-elements of protocol objects thereof.

With continued reference to FIG. 1, apparatus 100 may further include an interface 168 communicatively connected to processor 104. Interface 168 may be configured to display policy agreement 160 and elements thereof to entity 116. An "interface," as used in this disclosure, is a graphical user interface (GUI) that displays visual representation of information to an entity of a user device and permits entity to interact with information displayed. User device may include, without limitation, laptop, desktop, smartphone, tablet, and the like. Interface 168 may include a window in which policy agreement 160 may be displayed. Interface 168 may include one or more graphical locator and/or cursor facilities allowing entity 116 to interact with policy agreement 160; for instance, and without limitation, using a touchscreen, touchpad, mouse, keyboard, and/or other manual data entry device. Interaction may include entity 116 inputting a signature to policy agreement 160. Interface 168 may include one or more menus and/or panels permitting selection of data (e.g., entity data 112, protocol metric 128, plurality of protocol objects 132, policy sub-element 136, entity criterion 152, and the like) to be displayed and/or used, elements of data, functions, or other aspects of policy agreement 160 to be edited, added, and/or manipulated, options for importation of and/or linking to application programmer interfaces (APIs), exterior services, data stores, machine-learning models, and/or algorithms, or the like. Persons skilled in the art, upon reviewing the entirety of this disclosure, will be aware of various ways in which interface 168 and/or elements thereof may be implemented and/or used as described in this disclosure.

Figure 2:
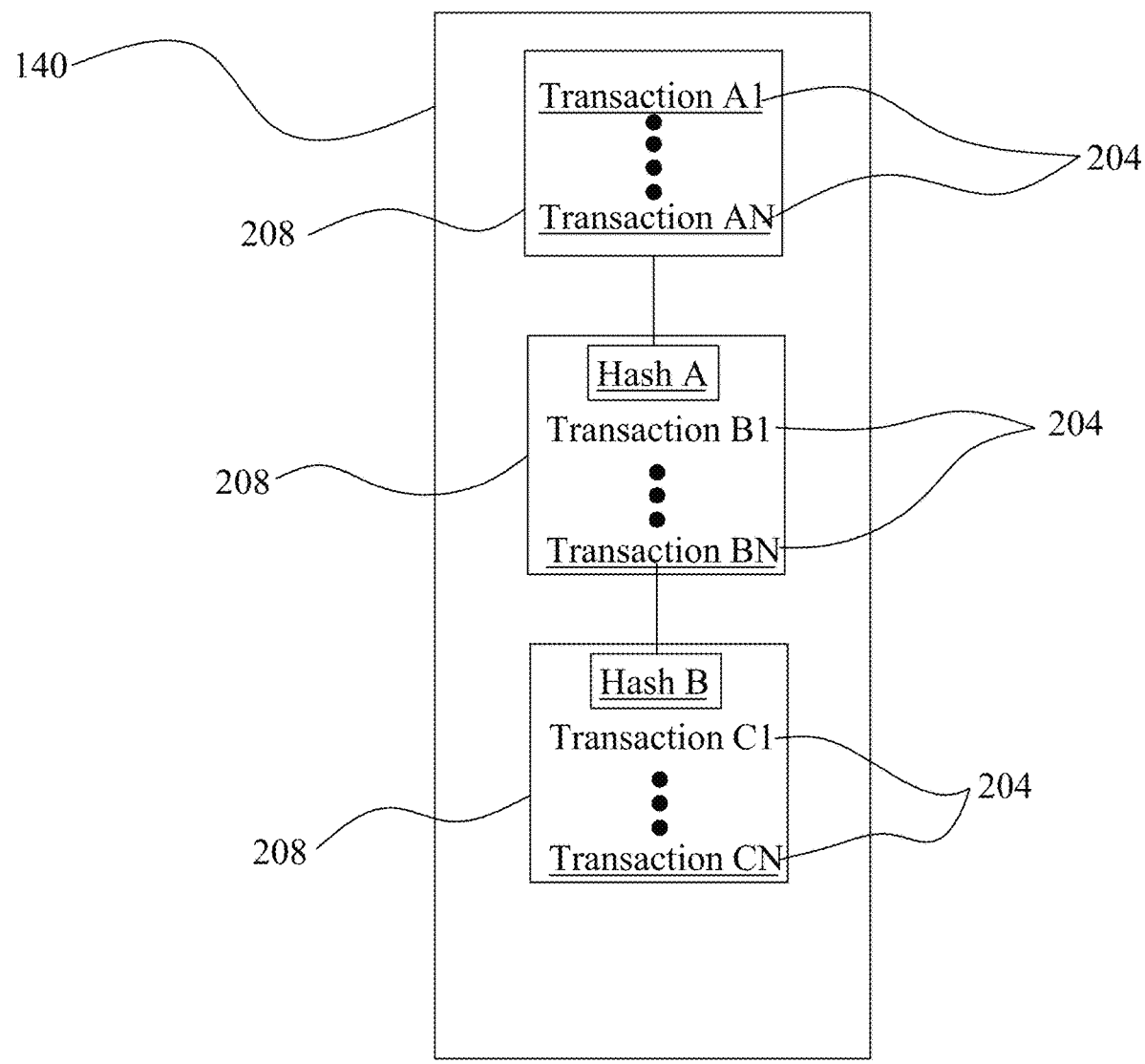
FIG. 2 is a block diagram of exemplary embodiment of an immutable sequential listing.

Referring now to FIG. 2, an exemplary embodiment of an immutable sequential listing 140 is illustrated. Data elements are listed in immutable sequential listing 140; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 140 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 140 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 140 may preserve the order in which the at least a posted content took place by listing them in chronological order; alternatively or additionally, immutable sequential listing 140 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 140 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 140 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 140, once formed, may be inalterable by any party, no matter what access rights that party possesses. For instance, immutable sequential listing 140 may include a hash chain, in which data is added during a successive hashing process to ensure non-repudiation. Immutable sequential listing 140 may include a block chain. In one embodiment, a block chain is immutable sequential listing 140 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 140 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 140 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 140 may develop a fork; protocol may determine which of the two alternate branches in the fork is the valid new portion of the immutable sequential listing 140 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 140 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 140.

Still referring to FIG. 2, additional data linked to at least a posted content may be incorporated in sub-listings 208 in the immutable sequential listing 140; for instance, data may be incorporated in one or more fields recognized by block chain protocols that permit a person or computer forming a at least a posted content to insert additional data in the immutable sequential listing 140. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
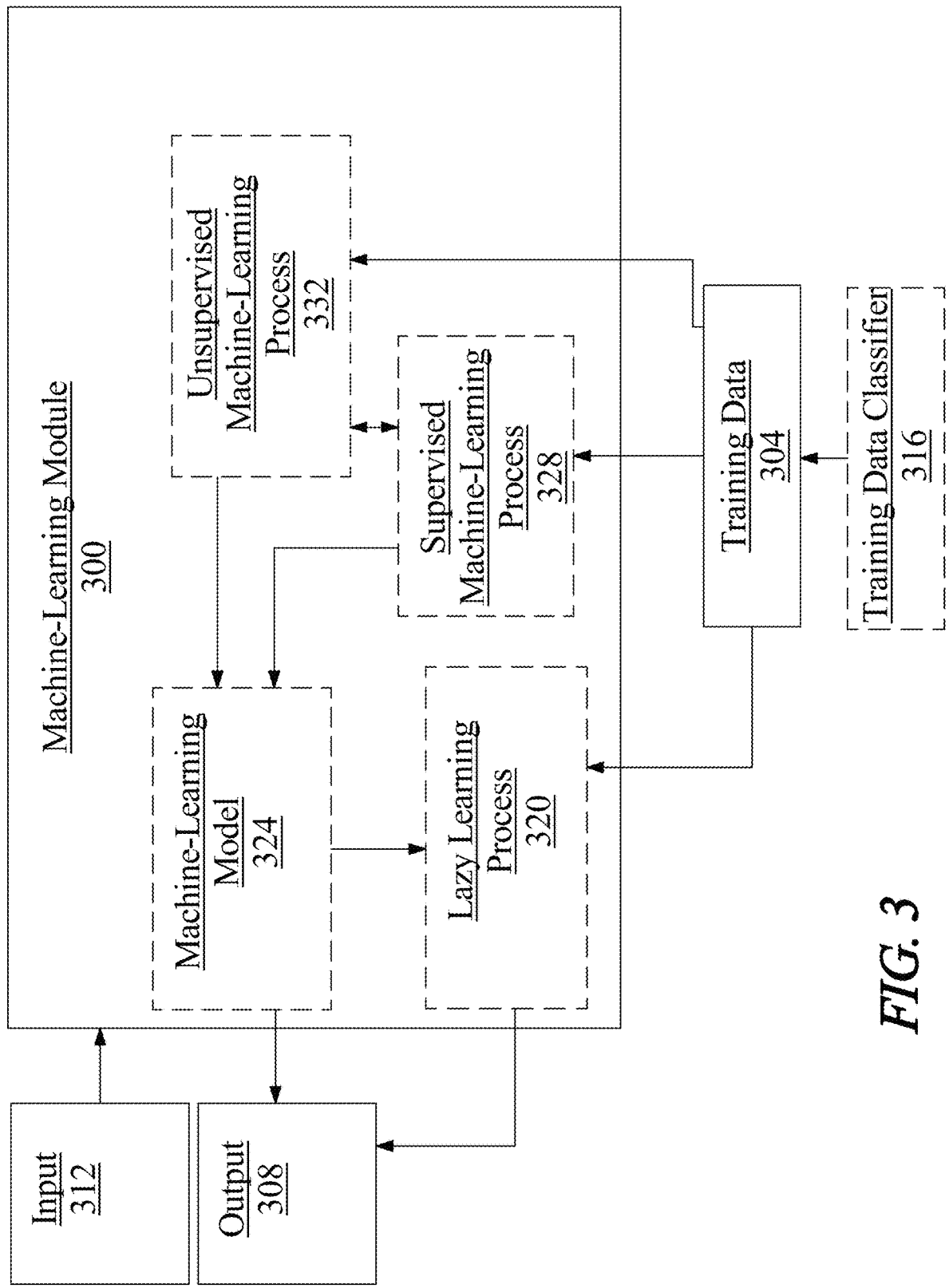
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
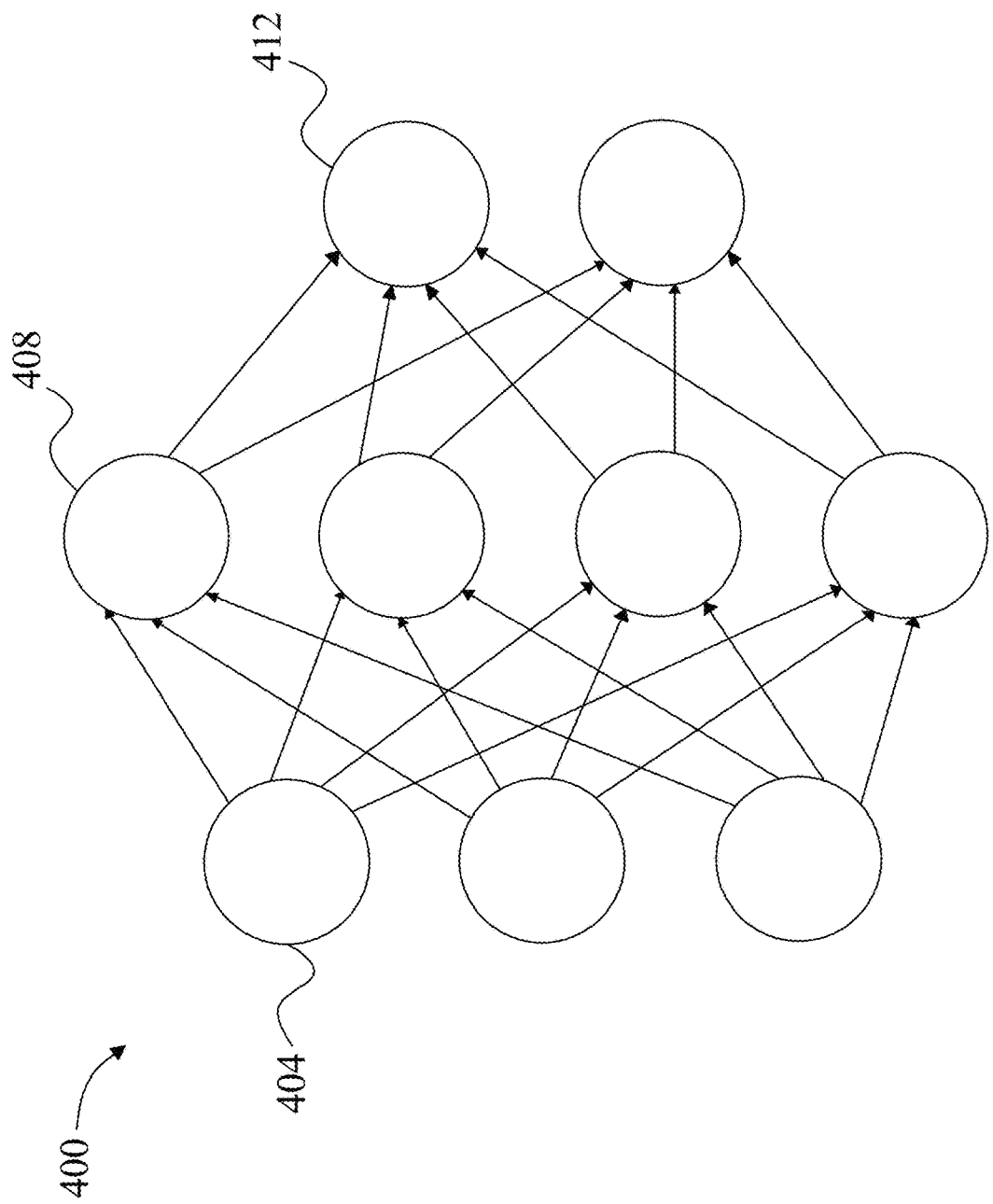
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
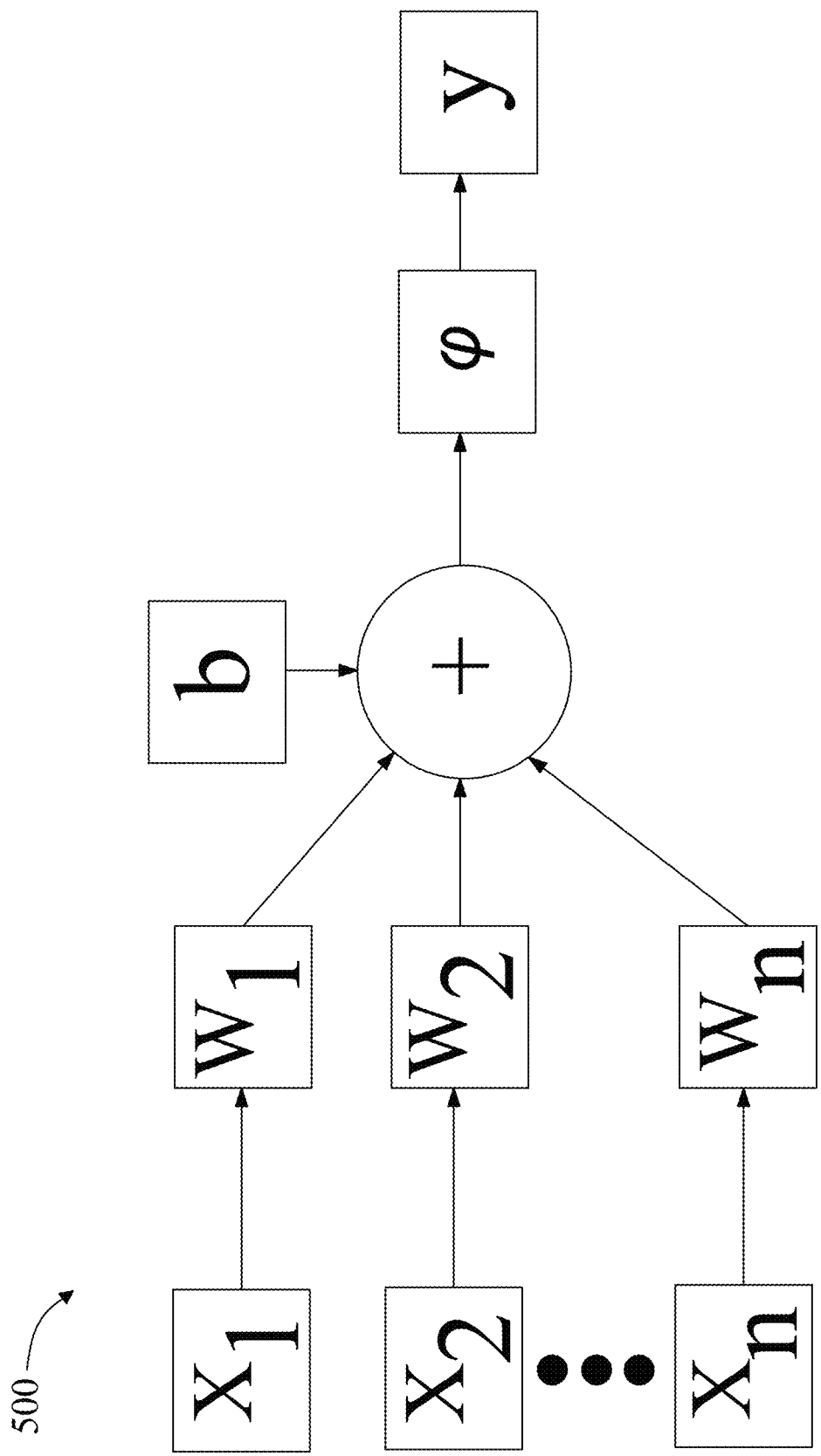
FIG. 5 is a block diagram of an exemplary embodiment of a node of a neural network.

Referring now to FIG. 5, an exemplary embodiment of a node of a neural network is illustrated. A node may include, without limitation, a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 6:
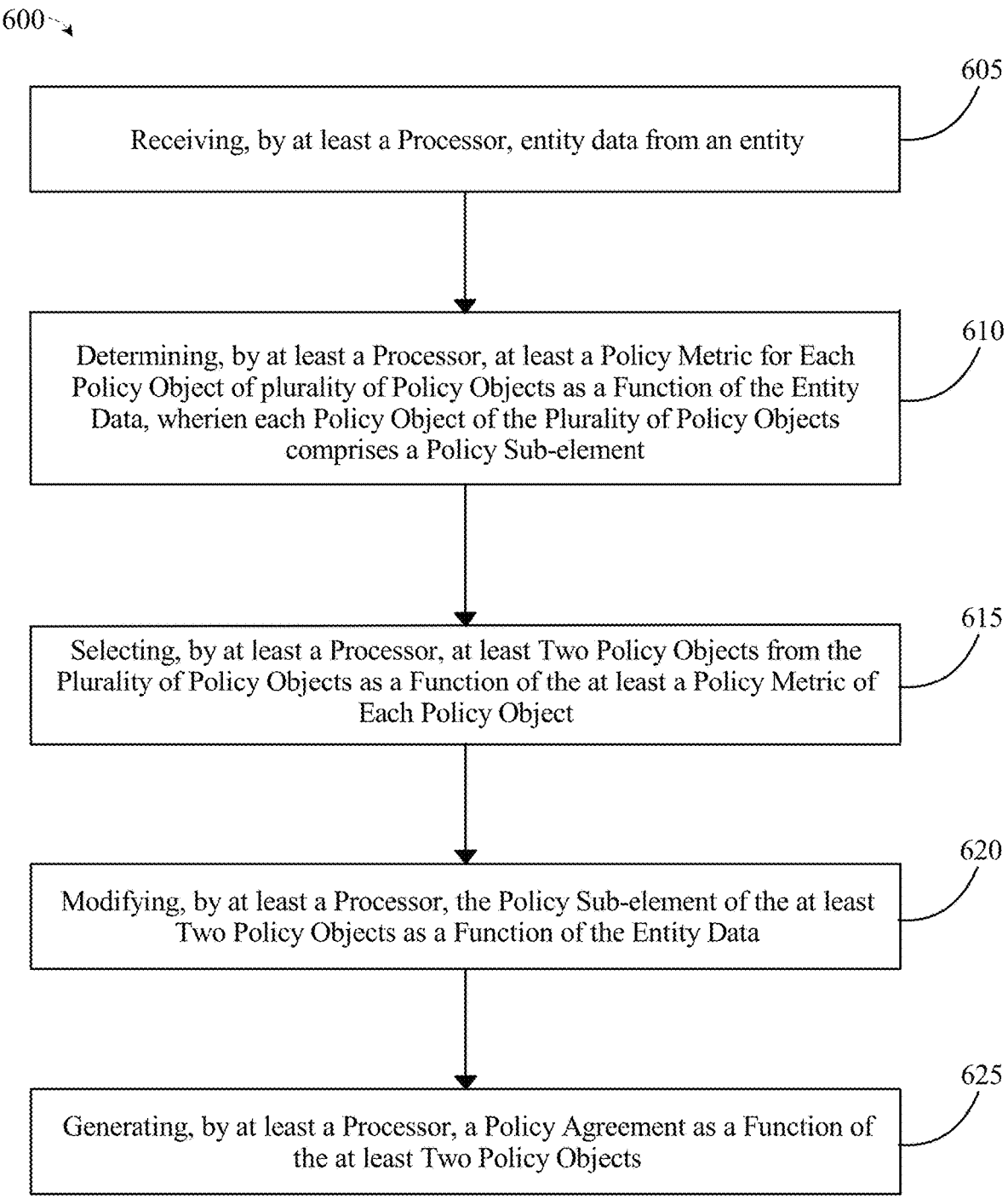
FIG. 6 is a flow diagram illustrating a method for determining and recommending transaction protocols.

Referring now to FIG. 6, a flow diagram of an exemplary method 600 for determining and recommending transaction protocols is illustrated. Method 600 includes a step 605 of receiving entity data from an entity. In some embodiments, the entity data may include historical claim data. In some embodiments, receiving entity data may include receiving entity data from a data store, wherein the data store may include a dealer management system (DMS). This may be implemented, without limitation, as described above with reference to FIGS. 1-5.

With continued reference to FIG. 6, method 600 includes a step 610 of determining at least a protocol metric for each protocol object of a plurality of protocol objects as a function of the entity data, wherein each protocol object of the plurality of protocol objects includes a policy sub-element. In some embodiments, the plurality of protocol objects may be contained in an immutable sequential listing in a decentralized platform. In some embodiments, determining at least a protocol metric for each protocol object of the plurality of protocol objects may include training a policy machine-learning model using a policy training data, wherein the policy training data may include a plurality of entity data as input correlated to a plurality of protocol metrics as output, and determining at least a protocol metric for each protocol object of the plurality of protocol objects as a function of the trained policy machine-learning model. This may be implemented, without limitation, as described above with reference to FIGS. 1-5.

With continued reference to FIG. 6, method 600 includes a step 615 of selecting at least two protocol objects from the plurality of protocol objects as a function of the at least a protocol metric of each protocol object. In some embodiments, selecting at least two protocol objects from the plurality of protocol objects may include generating an entity criterion as a function of the entity data and ranking each protocol object of the plurality of protocol objects as a function of the entity criterion via a ranking algorithm. This may be implemented, without limitation, as described above with reference to FIGS. 1-5.

With continued reference to FIG. 6, method 600 includes a step 620 of modifying the policy sub-element of the at least two protocol objects as a function of the entity data. This may be implemented, without limitation, as described above with reference to FIGS. 1-5.

With continued reference to FIG. 6, method 600 includes a step 625 of generating a policy agreement as a function of the at least two protocol objects. In some embodiments, generating the policy agreement may include combining the at least two protocol objects. In some embodiments, the policy agreement comprises a self-executing transaction protocol. This may be implemented, without limitation, as described above with reference to FIGS. 1-5.

With continued reference to FIG. 6, method 600 may include a step of posting, by the at least a processor, the policy agreement to the immutable sequential listing. Method 600 may further include a step of displaying, by an interface communicatively connected to the at least a processor, the policy agreement to the entity. This may be implemented, without limitation, as described above with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
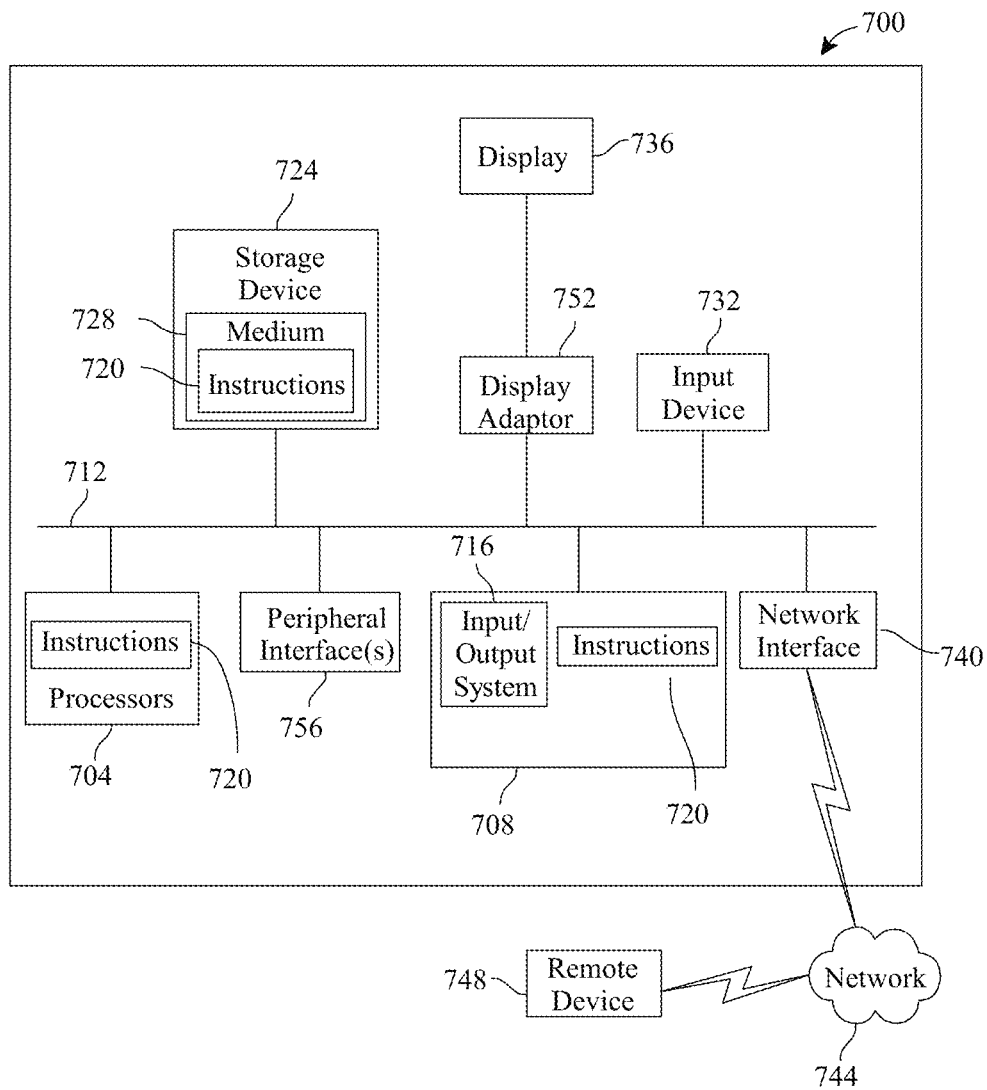
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining and recommending transaction protocols, wherein the apparatus comprises:
   at least a processor; and
   a memory communicatively connected to the at least a processor, wherein the memory contains instructions configuring the at least a processor to:
   receive entity data from an entity;
   determine at least a protocol metric for each protocol object of a plurality of protocol objects as a function of the entity data by assigning a rating score to each protocol object, wherein a protocol metric threshold is determined by the entity, wherein the protocol metric threshold is a predetermined value in which the at least a protocol metric for each protocol object of a plurality of protocol objects cannot exceed, wherein the at least a protocol metric for each protocol object of a plurality of protocol objects is compared to the protocol metric threshold, wherein each protocol object of the plurality of protocol objects comprises a policy sub-element wherein determining the at least a protocol metric for each protocol object of the plurality of protocol objects comprises:
      creating a policy training data, wherein the policy training data comprises a plurality of entity data as input correlated to a plurality of protocol metrics as output;
      training, by the processor, a policy machine-learning model comprising a network of at least an input layer of nodes, one or more intermediate layers, and an output layer of nodes using the policy training data, wherein each node of the at least an input layer of nodes corresponds to each of the plurality of entity data;
      generating, by each node of the at least an input layer of nodes, a weighted sum of the plurality of entity data as inputs using weights that are multiplied by the corresponding entity data, wherein the weighted sum is determined by the trained policy machine-learning model, wherein the weights applied to the input indicates whether the input is excitatory or inhibitory, wherein the correlation between the input and the output is determined as a function of the protocol metric threshold, and wherein training the policy machine-learning model comprises:
  updating the policy training data iteratively with previous outputs as a function of the input and the outputs of the policy training data;
  retraining the policy training data using the updated policy training data;
  generating connections between the nodes of the input layer, the one or more intermediate layers, and the output layer, wherein the connections are created by applying the training data to the input layer of nodes; and
  adjusting the connections and weights between nodes in adjacent layers to update the protocol metric threshold value at the output layer of nodes;
determining at least a protocol metric for each protocol object of the plurality of protocol objects as a function of the trained policy machine-learning model;
select at least two protocol objects from the plurality of protocol objects as a function of the protocol metric threshold value, wherein the selected at least two protocol objects meet the protocol metric threshold;
modify the policy sub-element of the at least two protocol objects by adjusting the policy sub-element to match the policy sub-element to the entity data; and
generate a policy agreement as a function of the at least two protocol objects, wherein the policy agreement comprises a self-executing transaction protocol.

2. The apparatus of claim 1, wherein the entity data comprises historical claim data.

3. The apparatus of claim 1, wherein receiving entity data comprises:
  receiving entity data from a data store, wherein the data store comprises a dealer management system (DMS).

4. The apparatus of claim 1, wherein the plurality of protocol objects is contained in an immutable sequential listing in a decentralized platform.

5. The apparatus of claim 1, wherein selecting at least two protocol objects from the plurality of protocol objects comprises:
  generating an entity criterion as a function of the entity data; and
  ranking each protocol object of the plurality of protocol objects as a function of the entity criterion via a ranking algorithm.

6. The apparatus of claim 1, wherein generating the policy agreement comprises combining the at least two protocol objects.

7. The apparatus of claim 4, wherein the memory further contains instructions configuring the at least a processor to:
  post the policy agreement to the immutable sequential listing.

8. The apparatus of claim 1, wherein the apparatus further comprises an interface communicatively connected to the at least a processor, wherein the interface is configured to display the policy agreement to the entity.

9. A method for determining and recommending transaction protocols, the method comprises:
  receiving entity data from an entity;
  determining, by a processor, at least a protocol metric for each protocol object of a plurality of protocol objects as a function of the entity data by assigning a rating score to each protocol object, wherein a protocol metric threshold is determined by the entity, wherein the protocol metric threshold is a predetermined value in which the at least a protocol metric for each protocol object of a plurality of protocol objects cannot exceed, wherein the at least a protocol metric for each protocol object of a plurality of protocol objects is compared to the protocol metric threshold, wherein each protocol object of the plurality of protocol objects comprises a policy sub-element, and wherein determining the at least a protocol metric for each protocol object of the plurality of protocol objects comprises:
    creating a policy training data, wherein the policy training data comprises a plurality of entity data as input correlated to a plurality of protocol metrics as output;
    training, by the processor, a policy machine-learning model comprising a network of at least an input layer of nodes, one or more intermediate layers, and an output layer of nodes using the policy training data, wherein each node of the at least an input layer of nodes corresponds to each of the plurality of entity data;
    generating, by each node of the at least an input layer of nodes, a weighted sum of the plurality of entity data as inputs using weights that are multiplied by the corresponding entity data, wherein the weighted sum is determined by the trained policy machine-learning model, wherein the weights applied to the input indicates whether the input is excitatory or inhibitory, wherein the correlation between the input and output is determined as a function of the protocol metric threshold, and wherein training the policy machine-learning model comprises:
      updating the policy training data iteratively with previous outputs as a function of the input and the outputs of the policy training data;
      retraining the policy training data using the updated policy training data;
      generating connections between the nodes of the input layer, the one or more intermediate layers, and the output layer, wherein the connections are created by applying the training data to the input layer of nodes; and
      adjusting the connections and weights between nodes in adjacent layers to update the protocol metric threshold value at the output layer of nodes;
    determining at least a protocol metric for each protocol object of the plurality of protocol objects as a function of the trained policy machine-learning model;
  selecting at least two protocol objects from the plurality of protocol objects as a function of the protocol metric threshold value, wherein the selected at least two protocol objects meet the protocol metric threshold value;
  modifying the policy sub-element of the at least two protocol objects by adjusting the policy sub-element to match the policy sub-element to the entity data; and
  generating a policy agreement as a function of the at least two protocol objects, wherein the policy agreement comprises a self-executing protocol.

10. The method of claim 9, wherein the entity data comprises historical claim data.

11. The method of claim 9, wherein receiving entity data comprises:
   receiving entity data from a data store, wherein the data store comprises a dealer management system (DMS).

12. The method of claim 9, wherein the plurality of protocol objects is contained in an immutable sequential listing in a decentralized platform.

13. The method of claim 9, wherein selecting at least two protocol objects from the plurality of protocol objects comprises:
   generating an entity criterion as a function of the entity data; and
   ranking each protocol object of the plurality of protocol objects as a function of the entity criterion via a ranking algorithm.

14. The method of claim 9, wherein generating the policy agreement comprises combining the at least two protocol objects.

15. The method of claim 12, wherein the method further comprises a step of:
   posting, by the at least a processor, the policy agreement to the immutable sequential listing.

16. The method of claim 9, wherein the method further comprises a step of:
   displaying, by an interface communicatively connected to the at least a processor, the policy agreement to the entity.

* * * * *